Patented Jan. 31, 1950

2,495,958

UNITED STATES PATENT OFFICE 2,495,958

DIALLYL ESTERS OF PHOSPHOROUS ACID

W E Craig, Philadelphia, and William F. Hester, Drexel Hill, Pa., assignors to Röhm & Haas Company, Philadelphia, Pa., a corporation of Delaware No Drawing. Application August 7, 1947, Serial No. 767,316

3 Claims. (Cl. 260—461)

This invention concerns diesters of allyl or methallyl alcohol and phosphorous acid. These esters are of the structure $$(CH_2=CR'CH_2O)_2POH$$

wherein R' is hydrogen or the methyl group. They have fungicidal properties which fit them for use in fungicidal preparations for treating plants. They are also useful as intermediates, as, for example, in the preparation of derivatives formed with aldehydes, as described in application Serial No. 620,636, filed October 5, 1945, now Patent No. 2,485,573.

The diesters of this invention may be prepared by reaction of allyl alcohol or methallyl alcohol with phosphorus trichloride, presumably to form a triester which reverts to the diester; thus, in the case of allyl alcohol, $$3CH_2=CHCH_2OH + PCl_3 \rightarrow$$
$$(CH_2=CHCH_2O)_3P + 3HCl \rightarrow$$
$$(CH_2=CHCH_2O)_2POH + CH_2=CHCHCl$$

Practically, however, the products obtained in such direct reaction with allyl alcohol and methallyl alcohol tend to contain a considerable proportion of the monoester. The yield of the diesters can be much improved by use in the reaction mixture of a tertiary amine which is free of groups reacting with phosphorus trichloride. The tertiary amine should be used in the proportion of two moles for one mole of the trichloride. Pyridine is a particularly useful tertiary amine for this reaction. The reaction is carried out at temperatures of 10° to 60° C.

The preparation of the compounds of this invention is shown in the following illustrative examples.

Example 1

To a stirred mixture of 261 grams of allyl alcohol in 237 grams of pyridine, there was slowly added 205 grams of phosphorus trichloride while the reaction mixture was stirred and the temperature was maintained below 40° C. by cooling. Stirring was continued for an hour, and ethylene dichloride was added. Pyridine hydrochloride was filtered off. The filtrate was concentrated on a boiling water bath to yield 292 grams of a viscous yellow oil. This oil corresponded in composition fairly closely with $$(CH_2=CHCH_2O)_2POH.$$

Example 2

To a stirred solution of 983 grams of allyl alcohol and 937 milliliters of pyridine in two thousand milliliters of ethylene dichloride, there was added 825 grams of phosphorus trichloride during the course of three hours. The temperature of the reaction mixture was kept below 40° C. by external cooling. After the phosphorus trichloride had been added, the mixture was stirred for two hours and left standing overnight. The pyridine hydrochloride which had separated was removed by filtration and extracted with one thousand milliliters of ethylene dichloride which was added to the filtrate. The filtrate was then heated on a boiling water bath and the volatile materials removed therefrom under reduced pressure. A small amount of diatomaceous earth was added to the residue to assist in the separation of a gummy yellow precipitate. There was obtained 821 grams of a light yellow oil which had a purity of 93% of $(CH_2=CHCH_2)_2POH$ and was contaminated with a little pyridine hydrochloride. The product was not distillable as it decomposed when subjected to elevated temperatures.

A sample of this product was taken up in acetone and diluted with water to give a 1% solution. This solution was fungicidal as shown by slide germination tests against *Macrosporium sarcinaeforme* Cav. and *Sclerotinia fructicola*. A solution diluted to 0.1% concentration was still toxic to *Macrosporium sarcinaeforme*.

Example 3

A mixture was made from 432.6 grams of methallyl alcohol, 316.4 grams of pyridine, and four hundred milliliters of ethylene chloride. Thereto was added dropwise 274 grams of phosphorus trichloride during the course of almost three hours. The reaction mixture was maintained between 9° and 45° C. It was stirred for an hour and twenty minutes after the trichloride had been added. Pyridine hydrochloride separated. This was removed by filtration and rinsed with ethylene chloride which was added to the filtrate. Solvent was evaporated by heating the filtered reaction mixture on a boiling water bath under reduced pressure. A clear yellow oil was obtained containing by analysis about 15% of phosphorus and corresponding to the desired diester of methallyl alcohol and phosphorous acid. This diester is not distillable.

This application is a continuation-in-part of our application Serial No. 620,636, filed October 5, 1945, wherein the claimed diesters were first disclosed.

We claim:
1. Compounds of the formula

$$(CH_2=CR'CH_2O)_2POH$$

wherein R' is selected from the class consisting of hydrogen and the methyl group.

2. A compound of the formula $$(CH_2=CHCH_2O)_2POH$$

3. A compound of the formula $$(CH_3=C(CH_3)CH_2O)_2POH$$

W E CRAIG.
WILLIAM F. HESTER.

REFERENCES CITED

The following references are of record in the file of this patent:

UNITED STATES PATENTS

| Number | Name | Date |
|---|---|---|
| 2,394,829 | Whitehill et al. | Feb. 12, 1946 |

OTHER REFERENCES

"Chemical Abstracts," vol. 13 (1919), pages 2865–66, abstract of an article by Milobendzki et al., "Chemik Polski," vol. 15, 34–7 (1917).